F. J. WUESTHOFF.
MAIL CHUTE.
APPLICATION FILED AUG. 1, 1916.
Reissued May 4, 1920.
14,854.
2 SHEETS—SHEET 1.
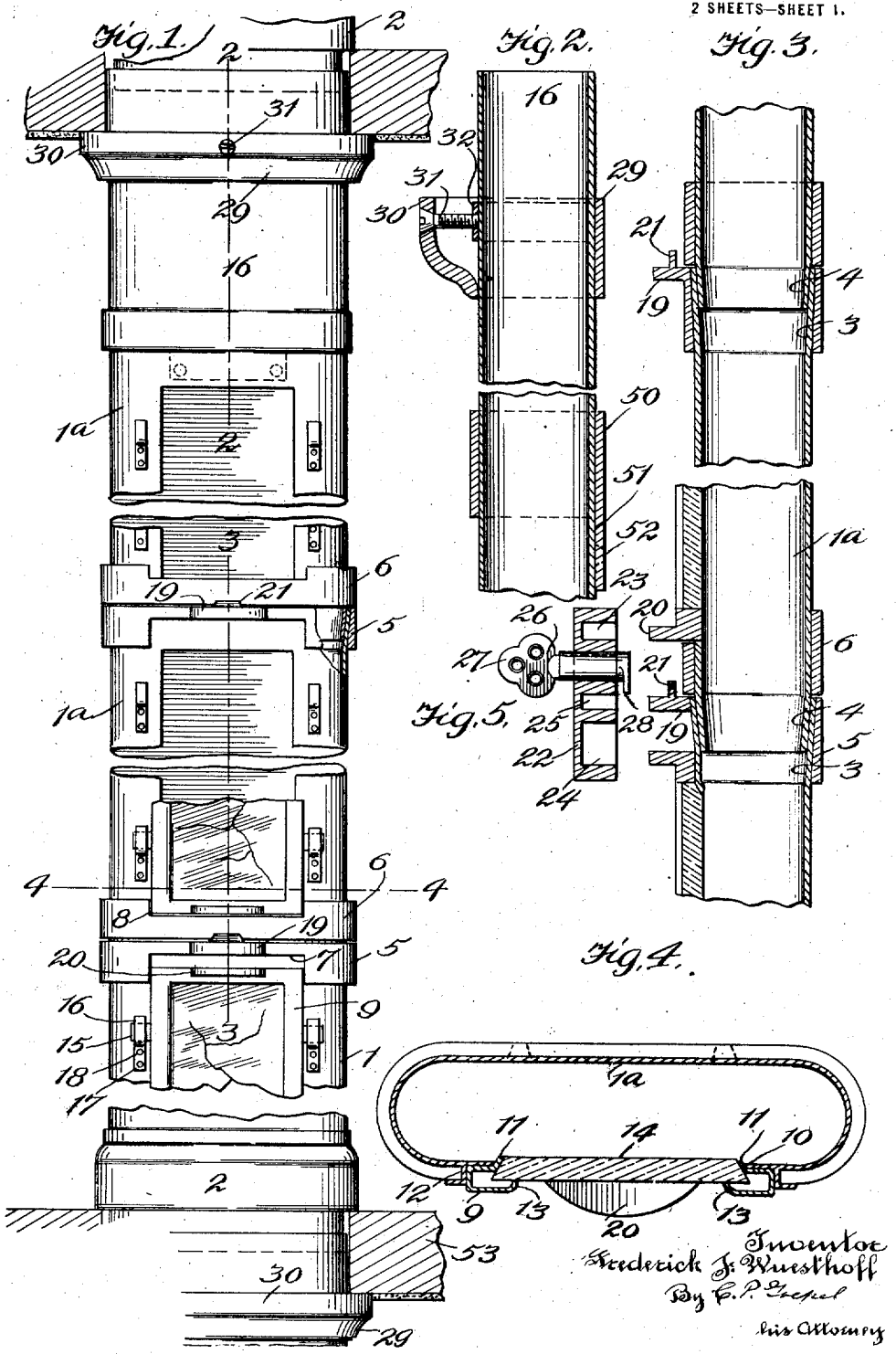

F. J. WUESTHOFF.

MAIL CHUTE.

APPLICATION FILED AUG. 1, 1916.

Reissued May 4, 1920.

14,854.

2 SHEETS—SHEET 2.

Inventor
Fredrick J. Wuesthoff
By R. P. Zeigel
his Attorney

UNITED STATES PATENT OFFICE.

FREDERICK J. WUESTHOFF, OF SAN FRANCISCO, CALIFORNIA, ASSIGNOR TO AMERICAN MAILING DEVICE CORPORATION OF NEW YORK.

MAIL-CHUTE.

14,854. Specification of Reissued Letters Patent. Reissued May 4, 1920.

Original No. 1,124,095, dated January 5, 1915, Serial No. 804,198, filed December 2, 1913. Application for reissue filed August 1, 1916. Serial No. 112,532.

*To all whom it may concern:*

Be it known that I, FREDERICK J. WUESTHOFF, a citizen of the United States, and a resident of San Francisco, in the county of San Francisco and State of California, have made certain new and useful Improvements in Mail-Chutes, of which the following is a specification.

My invention is an improvement in mail chutes, adapted for installation in buildings, and apartment houses, or like buildings, and has for its object to provide an improved construction of door for such chutes, and an improved method of arranging the glass in the door.

A further object of the invention is to provide an improved form of letter drop.

Figure 6:
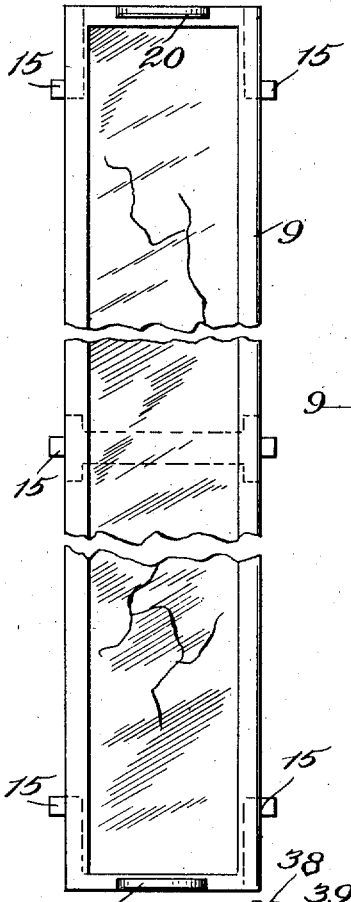
Figure 7:
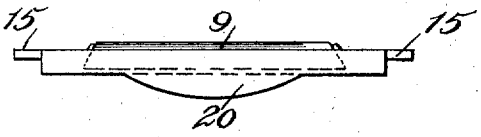
Figure 8:
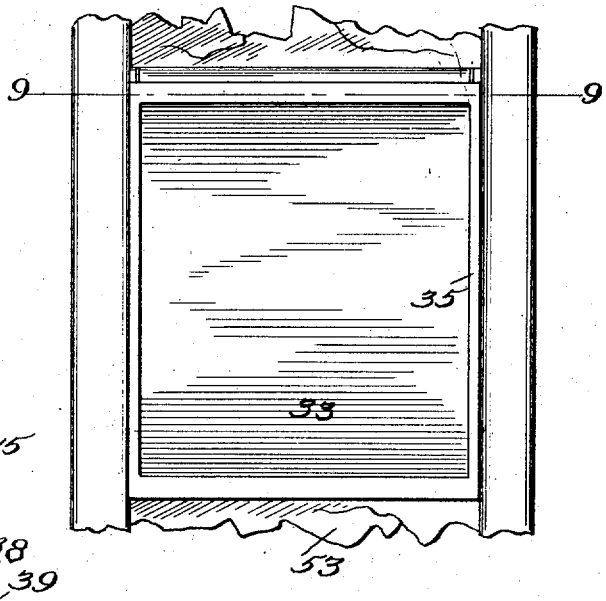
Figure 10:
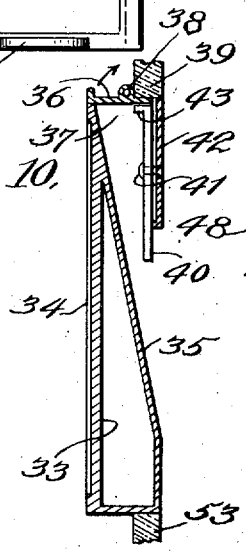
Figure 9:
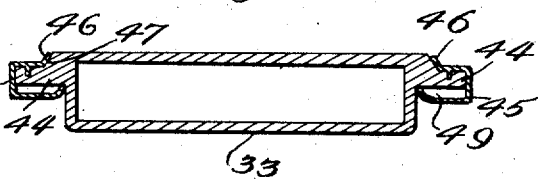

In the drawings: Figure 1 is a front view of the improved chute, Figs. 2, 3 and 4 are sections on the lines 2—2, 3—3, and 4—4, respectively, of Fig. 1. Fig. 5 is a sectional view of a door lock. Fig. 6 is a front view of one of the doors, Fig. 7 is a top plan view of Fig. 6, Fig. 8 is an enlarged partial front view of the letter drop, Fig. 9 is a section on the line 9—9 of Fig. 8, and Fig. 10 is a vertical section of Fig. 8.

In the present embodiment of the invention the body of the chute is of metal pressed or otherwise shaped to form, the chute being elliptical or oblong in cross section, as shown, and the said chute is composed of sections. The lowermost section 1 of the chute is provided with a base 2, and the upper end of the said section is flaring, as shown at 3 in Fig. 3. The lower ends of the succeeding sections $1^a$ are reduced and tapering, as shown at 4, to fit within the upper flaring ends 3 of the preceding sections.

A collar 5 encircles the meeting ends of the sections, each collar having its outer surface smooth and vertical, while its inner surface is frustoconical, or tapering as shown, to fit the flaring upper end 3 of the lower section. A second collar 6 encircles the lower portion of the upper section, and the lower edge of the collar 6 is designed to seat on the upper edge of the collar 5 immediately below. At the front of the chute each of the collars 5 is provided with a notch or recess 7 on its under edge, and each collar 6 is provided with a similar notch or recess 8 on its upper edge, the recess 8 being directly above the recess 7.

Each section $1^a$ has a door opening at its front, and each door opening is designed to be closed by a door. Each of the said doors comprises a substantially rectangular frame 9, and each of the door openings 10 is of lesser area than the frame, so that the frame fits on the outer face of the chute at the door opening around the same.

It will be noted that the side members of each of the door frames are of channel material (Fig. 4), the channel opening inwardly, and the inner edge of the inner wall of the channel of each frame is bent laterally at an oblique, and specifically, obtuse angle to the body portion, as shown at 11, to fit within the door opening, while the wall itself fits against the outer face of the chute, within a rib 12. For the sake of clearness, this rib (indicated in Fig. 4) has been omitted from Fig. 1. The free edge of the outer wall of the channel of each frame is also bent inwardly, as shown at 13, and the pane or sheet 14 of glass or other transparent material arranged within the frame is held between the portions 11 and 13 of the channel walls.

It will be noted that the side edges of the sheet 14 are beveled inwardly, to fit snugly against the portions 11 of the frame, and the portions 13 of the frame bear against the outer face of the glass, so that the glass is held between the side walls of the channel. Each door frame 9 is provided at each side with three laterally extending lugs 15, the said lugs being near the ends and intermediate the ends of the sides, and each lug is designed to engage a clip, secured to the chute wall at the side of the door opening, to hold the doors in place. Each of the clips consists of two portions 16 and 17 offset laterally from each other, the portion 17 of each clip being secured to the casing wall by means of screws or rivets 18. The portion 16 of each of the clips is thus spaced away from the chute wall, to receive the lug 15 therein.

Just above the recess 7 each collar 5 is provided with an outwardly extending lug or finger piece 19, and at each of its ends each door frame is provided with a laterally extending lug 20, the lugs 20 at adjoining ends of neighboring door frames registering with the interposed lug 19 of the collar 5. The lug 19 of each collar 5 is provided with an upstanding catch or lug 21 on its upper face, and near the face of the adjacent collar 6, and the lugs 19, 20 and 21 are designed to be engaged by a fastening or latching means to hold the door in place. Each fastening means is in the form of a plate 22 having an opening 23 on its inner face for receiving the lug 20 at the bottom of the door of one section, and a recess or opening 24 near its lower end for receiving the lug 20 at the upper end of the door of the preceding section. The plate is also provided with a recess or opening 25 between the recesses or openings 23 and 24 for receiving the lug 19 of the collar 5 between the door frames of adjacent sections.

A lock of any usual or desired construction, as for instance a Yale lock, has its barrel or cylinder 28[a] mounted in the plate 22, between the recesses 23 and 25, and a key 26 is provided for operating the lock. The key is provided with the usual finger piece 27, and the barrel or cylinder 28[a] of the lock has a lug 28 at its inner end which is adapted to engage behind the catch or lug 21 on the lug 19. When it is desired to lock the doors, the plate 22 is placed with the lugs 20 engaging the recesses 23 and 24. The key is then inserted in the lock and turned until the lug 28 engages behind the lug 21. When the key is removed, the plate is held in place by the engagement of the lugs 21—28, and the doors are held by the engagement of the lugs 20 with the recesses 23 and 24. The lugs 20 thus serve as a means for permitting the doors to be latched to the collar 5, and in addition the said lugs serve as a means for lifting the doors to disengage them from the clips 16—17. The plate 22 is a cap, being of a length approximately equal to the width of the doors. Where the chute passes through a floor, a section 1[b] of uniform cross section is used, and the said section may be of any desired length, and a collar 29 is arranged on the said section for engaging the ceiling to make a smooth, neat fit. The collar is slidable on the section, and at the front and sides of the casing the collar is arched or bent outwardly, the lower edge of the collar fitting the section, while the upper edge is spaced apart therefrom, as shown at 30 in Figs. 1 and 2.

A screw 31 is threaded through the collar at the front of the chute and near the upper edge of the collar, and the inner end of the screw bears against the front wall of the chute, to hold the collar in adjusted position. A strap 32 is provided at the arched out portion of the collar, the said strap fitting the chute closely, and the screw 31 is also threaded through an opening in the strap. The collar 29 may thus be adjusted to bring the upper edge thereof closely against the ceiling. The head of the screw 31 is countersunk, so that the outer face thereof is flush with the face of the collar.

The letter drop shown in Figs. 8, 9 and 10, is arranged in the first section of the chute at a height from the door in accordance with the regulation of the Post-Office Department. The said drop consists of a removable casing 33 whose outer face is substantially rectangular, as shown, and the said outer face is depressed, as shown at 34, to receive a card containing information in regard to the times of collection. The card fits in the depression, and the casing is arranged within an opening 35, in the front wall of the chute section. The opposite faces of the casing are inclined with respect to each other, the inner face 34′ meeting the outer face 34 at an acute angle at the top of the casing. The casing 33 is so arranged with respect to the chute that the outer wall is spaced outwardly from the front face of the chute section, and the upper edge of the casing where the inner and outer walls meet at an angle is spaced away in front of the chute wall to provide a passageway 37 for the letters. A leaf or flap 36 is hinged to the chute wall, as indicated at 38, to close the passage 37 when desired, and the outer edge of the said leaf or flap is adapted to rest upon the upper edge of the casing 33. The leaf or flap extends inwardly beyond its pivotal connection 38, as shown in Fig. 10, and when the flap or leaf is closed, this extended portion engages beneath the sheet 39 of glass, closing the front of the chute section above the letter drop.

The flap may be held closed by means of a locking lever 40 pivoted intermediate its ends, as indicated at 41, to the wall 42 of the chute section. The upper end of the lever is provided with a lateral lug 43, and the said upper end engages beneath the extended portion of the flap, to prevent lifting of the outer edge of the flap. It will be understood that the flap 36 is normally open, being held open by the lug 43 on the lever 40. The flap is never closed except when it is desired to prevent the insertion of mail on an upper floor, as for instance, during the time that the chute is undergoing repairs or is being cleaned. For instance in a ten-story building should repairs be necessary at the fifth floor the post master will close the letter drops above the fifth until the repairs are complete. It will be noticed from an inspection of Fig. 10 that the lug 43 of the lever 40 is of such length that when the outer edge of the flap 36 is swung up until the rib contacts with the element 39, which is the front of the chute, the said lug will engage behind the inner edge of the flap and will hold the flap lifted. When it is desired to close the flap under the conditions stated the lever 40 is swung to one side to release the flap and it is closed. To either open or close the flap 36, the panel or casing 33 is removed to permit access to the lever. After the flap has been placed in desired position the panel is replaced. When it is desired to lift the flap, the lever is swung to disengage the upper end thereof from the flap, after which the flap may be opened and may be held open by swinging the lever toward the extended edge of the flap of the chute wall 42.

The casing 33 is mounted in a frame 45 having side members of channel material and having the channel opening inwardly. The free edge of the inner wall of the channel is bent at an angle to the body thereof, as shown at 46, and the casing 33 is provided with a marginal rib 44 which is received between the walls of the channel of the frame. The ribs 44 are rabbeted on their inner faces to fit the rear wall of the channel and the portion 46, as indicated at 47, and the rear wall of the channel is traversed by screws 48 which engage in the rear face of the rib 44. The free edge of the front wall of the channel is bent, as shown at 49 to bear against the front face of the rib 44, at the junction of the said rib with the casing. Thus the casing is held firmly in place within the frame.

The plain section $1^b$, before mentioned, is connected to the next lower section by means of a collar 50. The said collar at the rear of the chute is extended downwardly, as shown at 51, in Fig. 2, and the extension is provided with openings 52 for receiving screws or the like to connect the collar to a wall. At all joints with the chute the upper member of the joint extends inwardly beyond the lower member, as shown for instance in Fig. 10, where the sheet 39 extends inwardly beyond the chute wall 42, and the lower end of the casing 33 extends inwardly beyond the sheet 53 of glass arranged below the drop.

It will be noted that where the chute passes through a floor, there is a collar 29 below the floor, and a base 2 above the floor. The base 2 may be separate from the chute, fitting over the chute in the same manner as the collar 29. Intermediate the upper and lower faces of the floor is found the joint between the sections.

The base 2 resembles the collar 29, in that it fits the chute closely at one end, the other end being offset outwardly away from the chute at the front thereof. At the rear of the chute the base fits the chute closely from one end of the base to the other, in the same manner as the collar 29. The base at the outwardly offset portion may be arranged in the same manner as the collar, as shown in Fig. 2, having a strap for engaging the front of the chute.

I claim:

1. A mail chute comprising a chute body provided with a door opening, a door frame having inwardly-open side channels the inner walls of which have their inner edges bent laterally obliquely to fit into said opening, the outer channel walls having their inner edges bent toward said opening, and a pane set in said frame and having its outer surface in engagement with the inner edges of said outer channel walls, and its side edges beveled and fitted against the oblique inner edges of the inner channel walls.

2. A mail chute comprising a chute body provided with a door opening, a door frame having inwardly-open side channels the inner walls of which have their inner edges bent laterally obliquely to fit into said opening, and a pane set in said frame and having its outer surface in engagement with the outer walls of said channels, and its side edges beveled to fit against the oblique inner edges of the inner channel walls.

3. A mail chute comprising a chute body provided with a door opening, and a door having laterally bent edges projecting therefrom obliquely to fit within said opening.

4. A mail chute comprising a chute body provided with a door opening, a door frame having side members whose inner edges are bent laterally obliquely, and a pane set within said frame and having its side edges beveled to fit against said oblique edges of the door frame.

5. A mail chute comprising a chute body provided with a door opening and with an outwardly-projecting rib adjacent to said opening, and a door whose outer portions engage the inner surface of said rib, said door having laterally-bent edges projecting from its inner face into said door opening.

6. In a mail chute having an opening, a closure for the opening, and comprising a casing seated in the opening, the inner wall of the casing inclining outwardly toward the upper end of the casing and meeting the outer wall at the top of the casing to form a slot between the top of the casing and the wall of the chute. a plate hinged to the wall of the chute and normally closing the slot, said plate being hinged intermediate its side edges, and the inner edge of the plate bearing against the top of the opening when the plate is closed, and a lock for the plate, said lock comprising a lever hinged to the chute and normally standing in vertical position with its upper end below the inner side edge of the plate.

7. In a mail chute having an opening, a closure for the opening, and comprising a casing seated in the opening, the inner wall of the casing inclining outwardly toward the upper end of the casing and meeting the outer wall at the top of the casing to form a slot between the top of the casing and the wall of the chute, a plate hinged to the wall of the chute and normally closing the slot, said plate being hinged intermediate its side edges, and the inner edge of the plate bearing against the top of the opening when the plate is closed, and a lock for the plate.

8. In a mail chute having an opening, a closure for the opening, and comprising a casing seated in the opening, the inner wall of the casing inclining outwardly toward the upper end of the casing and meeting the outer wall at the top of the casing to form a slot between the top of the casing and the wall of the chute, and a cover hinged to the chute and normally closing the slot.

9. A mail chute provided with an opening or slot for the introduction of mail matter, a movable cover for said slot, and a movable member adapted to lock said cover either in its open or in its closed position.

10. A mail chute provided with an opening or slot for the introduction of mail matter, a hinged cover for said slot, and a pivoted member adapted to lock said cover either in its open or in its closed position.

In testimony whereof I have affixed my signature in presence of two subscribing witnesses.

FREDERICK J. WUESTHOFF.

Witnesses:
R. L. Husted,
B. F. Emery.